United States Patent [19]

Umeda et al.

[11] Patent Number: 5,113,053
[45] Date of Patent: May 12, 1992

[54] WELDING GUN FOR ROBOT

[75] Inventors: Shigeru Umeda; Tsuyoshi Takatori, both of Tokyo, Japan

[73] Assignee: Obara Corporation, Tokyo, Japan

[21] Appl. No.: 674,557

[22] Filed: Mar. 22, 1991

[30] Foreign Application Priority Data

May 9, 1990 [JP] Japan .................. 2-47708[U]

[51] Int. Cl.⁵ ............... B23K 11/31; B23K 11/24; B25J 11/00
[52] U.S. Cl. .................. 219/116; 219/86.33; 901/42
[58] Field of Search ........ 219/86.25, 89, 116, 219/90, 86.33; 901/42

[56] References Cited

U.S. PATENT DOCUMENTS 4,559,438 12/1985 Nakadate et al. .......... 219/116
4,771,160 9/1988 Pitsch et al. ............... 219/90

FOREIGN PATENT DOCUMENTS 3346420 6/1985 Fed. Rep. of Germany ... 219/86.25
59-1072 1/1984 Japan .................... 219/89
60-180683 9/1985 Japan .................... 219/116

Primary Examiner—Geoffrey S. Evans
Attorney, Agent, or Firm—Flynn, Thiel, Boutell & Tanis

[57] ABSTRACT

The present invention provides a welding gun for robot provided with a cradle formed of a hollow frame. The cradle has side plates serving also as stopper receivers for receiving stoppers of the welding gun arms, thereby eliminating an extra member for receiving the stoppers and laborious working for attachment of such extra member. A space to be occupied by the extra member is omitted and can be effectively utilized for holding a welding transformer.

9 Claims, 2 Drawing Sheets

WELDING GUN FOR ROBOT

BACKGROUND OF THE INVENTION

1. Field of the Invention

The present invention relates to a welding gun for a robot, paticularly to stopper receivers of welding gun arms.

2. Prior Art

Conventional stopper receivers of welding gun arms are illustrated in FIGS. 3 and 4.

A cradle 25 has a pivotal mounting portion 24 at one end thereof for pivotally mounting welding gun arms 22 and 23 which are openable by a pneumatic cylinder 21 and an attachment base 26 at the other end thereof for attaching the cradle 25 to a wrist of the robot. The welding gun arms 22 and 23 have stoppers 27 and 28 which can be brought into contact with a central portion of a bracket 31 for connecting both side plates 29 and 30 of the cradle 25.

Inasmuch as the stoppers 27 and 28 can be brought into contact with the central portion of the bracket 31 for connecting both the side plates 29 and 30 of the cradle 25, an extra member such as the bracket 31 other than the cradle 25 shall be welded to the cradle 25 which involved such a problem that the attachment working of the side plates to the bracket was laborious and space for installation thereof was needed.

SUMMARY OF THE INVENTION

The present invention has been made to solve the problem of the conventional stopper receivers of welding gun arms.

It is an object of the present invention to provide a welding gun for a robot capable of eliminating the extra member by rendering side plates of the cradle to serve also as the stopper receivers and capable of utilizing space effectively.

To achieve the object of the present invention, the welding gun for a robot comprises a cradle having a pivotal mounting portion at one end thereof on which welding gun arms are pivotally mounted and an attachment base portion at the other end thereof to which a robot wrist is attached, characterized in that the cradle forms a hollow frame composed of the attachment base portion and side plates of the cradle, the side plates serving as stopper receivers of stoppers of the welding gun arms.

The above and other objects, features and advantages of the present invention will become more apparent from the following description taken in conjunction with the accompanying drawings.

PREFERRED EMBODIMENT OF THE INVENTION

A welding gun for a robot according to a preferred embodiment of the present invention will be described with reference to FIGS. 1 and 2.

Figure 1:
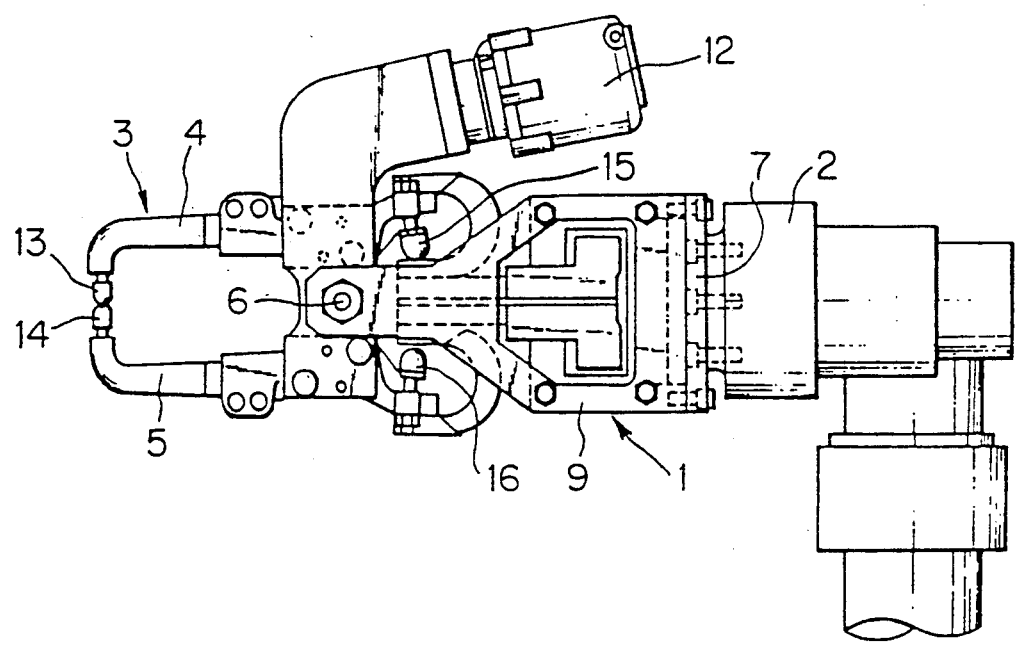
FIG. 1 is a side view of a welding gun for a robot according to a preferred embodiment of the present invention.
Figure 2:
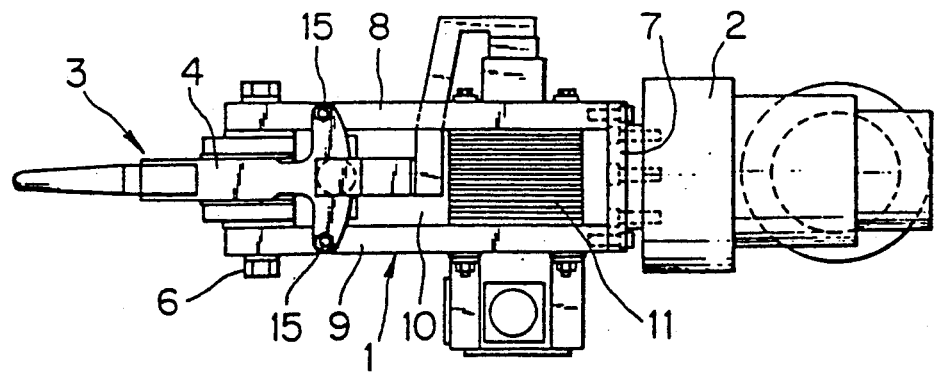
FIG. 2 is a plan view of FIG. 1.
Figure 3:
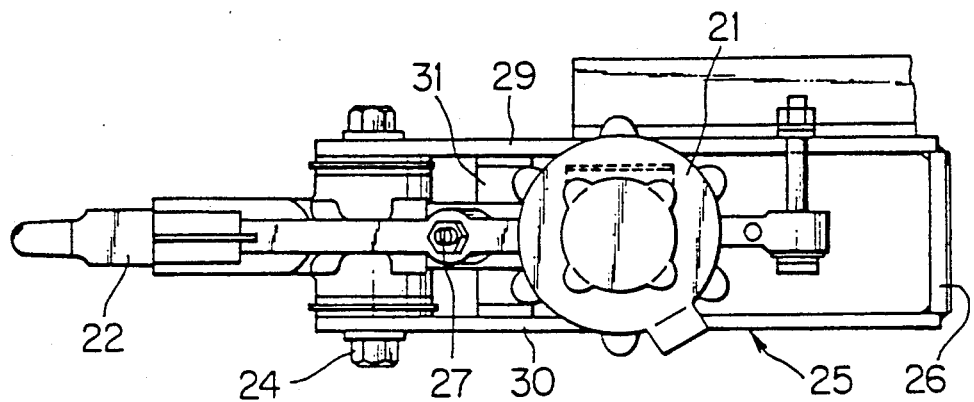
FIG. 3 is a plan view of a conventional welding gun for robot.
Figure 4:
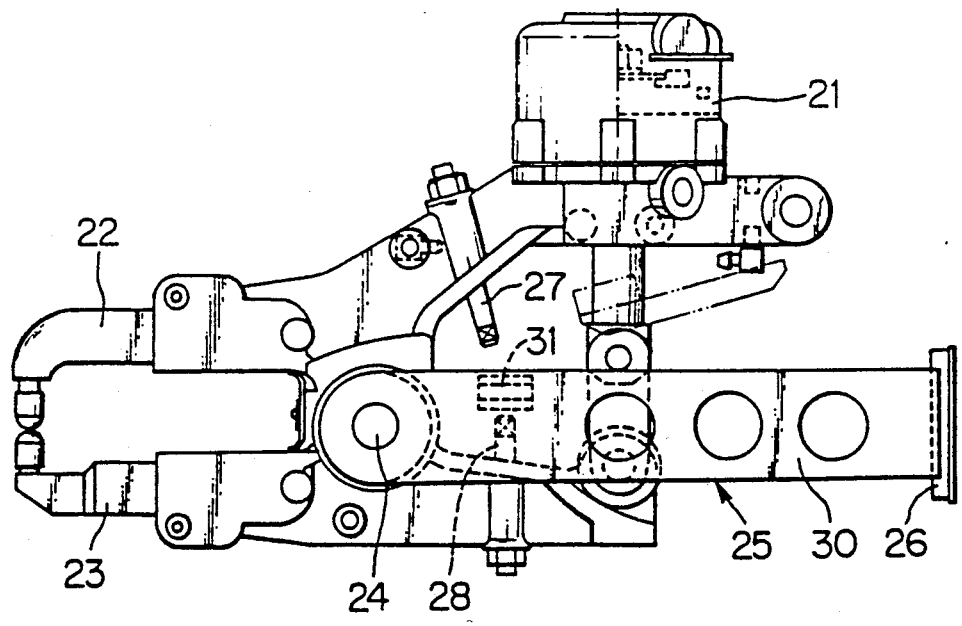
FIG. 4 is a side view of FIG. 3.

In FIGS. 1 and 2, designated at 1 is a cradle interposed between a robot wrist 2 and a welding gun 3. The cradle 1 has a pivotal mounting portion 6 at one end thereof on which welding gun arms 4 and 5 are pivotally mounted and an attachment base portion 7 at the other end thereof which is fixed to the robot wrist 2. The cradle 1 forms a hollow frame 10 by the attachment base portion 7 and side plates 8 and 9.

Designated at 12 is a pneumataic cylinder which operates to open or close electrodes 13 and 14 provided at tip ends of the welding gun arms 4 and 5. The welding gun arms 4 and 5 have stoppers 15 and 15, 16 and 16 at the rear portions thereof which are connected to the side plates 8 and 9 of the cradle 1 so as to be adjusted.

When the welding gun 3 is moved by the robot, the pneumatic cylinder 12 is operated to open the distance between the electrodes 13 and 14 while the stoppers 15 and 15, 16 and 16 are brought into contact with the side plates 8 and 9, thereby fixing the welding gun arms 4 and 5 with assurance to prevent the jolt of the welding gun arms 4 and 5. The arms 4 and 5 include a T-shaped portion having a cap part on which the stoppers 15 and 16 are mounted (see FIG. 2). The cradle 10 has a transformer 11 within the hollow frame thereof.

According to the present invention, the stoppers provided at the welding gun arms are brought into contact with the side plates of the cradle for rendering the electrodes of the welding gun to be open at the predetermined position with assurance when the welding gun is moved by the robot. The side plates of the cradle are served as the stopper receivers of the stoppers of the welding gun arms. Hence, the bracket for connecting both the side plates of the cradle as employed in the prior art was eliminated so that such bracket is not necessary to be manufactured and the space to be occupied by such bracket will be effectively used such that the welding transformer can be disposed within the space.

Furthermore, if the welding transformer can be disposed within the cradle, the length of the welding gun can be shortened.

Although the invention has been described in its preferred form with a certain degree of particularity, it is to be understood that many variations and changes are possible in the invention without departing from the scope thereof.

What is claimed is:

1. A welding gun for a robot, comprising:

a cradle including a pivotal mounting portion at one end thereof, an attachment base portion at the other end thereof for facilitating attachment of said cradle to a robot wrist, and a pair of generally opposed side plates extending between said pivotal mounting portion and said attachment base portion, said side plates being disposed in generally parallel spaced relationship;

a pair of welding gun arms pivotally mounted on said pivotal mounting portion of said cradle, each said welding gun arm having a stopper mounted thereon and disposed between said pivotal mounting portion and said attachment base portion of said cradle;

means for effecting pivotal movement of said welding gun arms and said stoppers about a pivot axis defined by said pivotal mounting portion of said cradle; and means for causing said stoppers to travel along respective paths of pivotal movement which each intersect with and terminate at one of said side plates of said cradle.

2. A welding gun according to claim 1, including a welding transformer disposed within said cradle between said side plates.

3. A welding gun according to claim 1, wherein said side plates are connected to said attachment base portion to define therewith a hollow frame, and including a welding transformer disposed within said hollow frame.

4. A welding gun according to claim 1, wherein each said welding gun arm has a pair of said stoppers mounted thereon, each said welding gun arm including a T-shaped portion projecting from said pivotal mounting portion toward said attachment base portion of said cradle, said T-shaped portion including an elongate cap part which extends transversely between said side plates, said stoppers being mounted adjacent opposite ends of said cap part so as to be spaced from each other by an amount approximately equal to the spacing between said side plates.

5. A welding gun according to claim 4, wherein each said side plate has opposite edges, said opposite edges being positioned in the respective paths of pivotal movement of said stoppers.

6. A welding gun according to claim 5, including a welding transformer disposed in said cradle between said side plates and adjacent said attachment base portion.

7. A welding gun according to claim 6, wherein said cap part and said stoppers mounted thereon are disposed between said pivot axis and said welding transformer, said pivot axis extending in generally parallel relationship with said elongate cap part.

8. A welding gun according to claim 1, wherein each said welding gun arm includes an elongate part which extends transversely between said side plates, said stopper being mounted adjacent one end of said transversely extending elongate part.

9. A welding gun according to claim 8, wherein each said welding gun arm has a pair of said stoppers mounted thereon, each said stopper being mounted adjacent a respective end of the associated transversely extending elongate part, said stoppers of each said pair being spaced from each other by an amount approximately equal to the spacing between said side plates.

* * * * *